United States Patent
Lyle et al.

(10) Patent No.: US 9,592,733 B2
(45) Date of Patent: Mar. 14, 2017

(54) WORKING MACHINE

(71) Applicant: J. C. Bamford Excavators Limited, Uttoxeter, Staffordshire (GB)

(72) Inventors: Jonathan Lyle, Uttoxeter (GB); John Griffin, Uttoxeter (GB)

(73) Assignee: J. C. Bamford Excavators Limited, Uttoxeter, Staffordshire (GB)

( * ) Notice: Subject to any disclaimer, the term of this patent is extended or adjusted under 35 U.S.C. 154(b) by 0 days.

(21) Appl. No.: 14/927,339

(22) Filed: Oct. 29, 2015

(65) Prior Publication Data
US 2016/0121721 A1 May 5, 2016

(30) Foreign Application Priority Data

Oct. 29, 2014 (GB) .................................. 1419276.9

(51) Int. Cl.
*B60K 17/356* (2006.01)
*E02F 9/22* (2006.01)
(Continued)

(52) U.S. Cl.
CPC ............ *B60K 17/356* (2013.01); *B60K 23/08* (2013.01); *B60K 25/06* (2013.01); *E02F 3/32* (2013.01);
(Continued)

(58) Field of Classification Search
CPC B60K 17/356; B60K 25/06; B60K 2025/065; F16H 39/06; E02F 3/32;
(Continued)

(56) References Cited

U.S. PATENT DOCUMENTS 2,470,209 A * 5/1949 Bechman ............... B62D 11/08
180/6.44
3,612,202 A * 10/1971 Moon, Jr. ............... F16H 47/02
180/14.3
(Continued)

FOREIGN PATENT DOCUMENTS

EP 2 594 828 A1 5/2013
JP 61-18524 1/1986
(Continued)

OTHER PUBLICATIONS

Search Report for GB 1419276.9, dated Apr. 27, 2015.
Extended European Search Report for EP Patent Application No. 15 19 2198, dated Apr. 28, 2016.

*Primary Examiner* — Hau Phan
*Assistant Examiner* — Jacob Meyer
(74) *Attorney, Agent, or Firm* — Marshall, Gerstein & Borun LLP

(57) ABSTRACT

A working machine comprising: a ground engaging structure with a first and second axle, each mounting two wheels; a body supported on the ground engaging structure, a working arm mounted to the body; and a drive arrangement for moving the ground engaging structure to propel the working machine, the drive arrangement including a prime mover and transmission. The transmission comprises a hydraulic pump driven by the prime mover, a first high speed hydraulic motor to drive the first axle to permit the working machine to be driven at relatively high speeds in a first two-wheel drive operating mode, and a second low speed motor to be supplied with hydraulic fluid from the hydraulic pump to drive the second axle at relatively low speeds and configured to be driven in conjunction with the first motor in a second four-wheel drive operating mode.

18 Claims, 5 Drawing Sheets

(51) Int. Cl.

| | |
|---|---|
| *F16H 61/444* | (2010.01) |
| *B60K 25/06* | (2006.01) |
| *E02F 3/32* | (2006.01) |
| *E02F 9/02* | (2006.01) |
| *E02F 9/08* | (2006.01) |
| *F16H 39/06* | (2006.01) |
| *B60K 23/08* | (2006.01) |
| *E02F 9/00* | (2006.01) |
| *E02F 9/12* | (2006.01) |

(52) U.S. Cl.
CPC .............. *E02F 3/325* (2013.01); *E02F 9/006* (2013.01); *E02F 9/02* (2013.01); *E02F 9/0866* (2013.01); *E02F 9/0883* (2013.01); *E02F 9/121* (2013.01); *E02F 9/2253* (2013.01); *E02F 9/2275* (2013.01); *E02F 9/2292* (2013.01); *F16H 39/06* (2013.01); *F16H 61/444* (2013.01); *B60K 2025/065* (2013.01)

(58) Field of Classification Search
CPC ......... E02F 9/02; E02F 9/0866; E02F 9/0883; E02F 9/2292
USPC ........................................................ 180/306
See application file for complete search history.

(56) References Cited

U.S. PATENT DOCUMENTS

| | | | | |
|---|---|---|---|---|
| 3,780,820 A * | 12/1973 | Schwab | ............. | F16H 61/4069 180/243 |
| 3,812,676 A * | 5/1974 | Smith | ...................... | B65F 3/00 414/525.4 |
| RE28,765 E * | 4/1976 | Smith | .................. | G03G 15/101 118/410 |
| 4,528,871 A * | 7/1985 | Nembach | ............... | B60K 17/10 180/242 |
| 5,390,759 A * | 2/1995 | Gollner | ................. | F16H 61/421 180/307 |
| 5,549,187 A * | 8/1996 | Kofler | .................. | F16D 41/105 192/103 R |
| 5,560,203 A * | 10/1996 | Pollman | ................ | B60W 10/06 477/20 |
| 5,784,883 A * | 7/1998 | Ohkura | ................. | B60W 10/06 60/327 |
| 5,819,870 A * | 10/1998 | Braun | ..................... | E01C 19/48 180/197 |
| 5,848,664 A * | 12/1998 | Kaspar | ............... | B60K 23/0808 180/197 |
| 5,915,492 A * | 6/1999 | Yates | ................... | B60K 17/356 180/197 |
| 5,946,910 A * | 9/1999 | Hayashi | ................ | E02F 9/2225 60/421 |
| 6,033,334 A * | 3/2000 | Showalter | .......... | B60K 17/3505 180/249 |
| 6,123,183 A * | 9/2000 | Ito | ......................... | B60K 23/08 192/220 |
| 6,189,641 B1 * | 2/2001 | Azuma | .................. | B60K 17/10 180/242 |
| 6,209,675 B1 * | 4/2001 | Hayashi | ............... | F16H 61/4017 180/165 |
| 6,226,987 B1 * | 5/2001 | Hayashi | .................. | F16D 31/02 60/447 |
| 6,408,972 B1 * | 6/2002 | Rodgers | ............... | B60K 28/165 180/197 |
| 6,547,025 B1 * | 4/2003 | Gassmann | ............. | B60K 17/00 180/245 |
| 6,557,677 B2 * | 5/2003 | Peura | .................... | F16D 41/088 180/247 |
| RE38,632 E * | 10/2004 | Schmidt | ............... | B62D 11/003 180/6.32 |
| 6,938,719 B2 * | 9/2005 | Ishimaru | ............... | B60W 10/06 180/305 |
| 7,246,670 B2 * | 7/2007 | Hayashi | ................... | B62D 5/07 180/305 |
| 7,276,016 B2 * | 10/2007 | Ishii | ...................... | B60W 10/06 477/115 |
| 7,503,172 B2 * | 3/2009 | Sakakura | ............... | B60K 17/10 180/242 |
| 7,712,565 B2 * | 5/2010 | Udagawa | ............... | B60K 17/10 180/242 |
| 8,307,924 B2 * | 11/2012 | Wang | ....................... | B60K 6/40 180/65.21 |
| 8,474,556 B2 * | 7/2013 | Wang | ....................... | B60K 6/40 180/65.22 |
| 8,540,601 B2 * | 9/2013 | Wang | ....................... | B60K 6/442 180/65.22 |
| 2003/0192762 A1 * | 10/2003 | Peura | .................... | F16D 41/088 192/36 |
| 2004/0237490 A1 * | 12/2004 | Yasuda | ............... | A01D 34/6806 56/10.8 |
| 2005/0230171 A1 * | 10/2005 | Hasegawa | ........... | B60K 17/105 180/242 |
| 2007/0163854 A1 * | 7/2007 | Irikura | ............... | B60K 17/3505 192/50 |
| 2007/0235241 A1 * | 10/2007 | Udagawa | ............... | B60K 17/10 180/242 |
| 2008/0314675 A1 * | 12/2008 | Nozaki | .................. | B60K 17/10 180/305 |
| 2009/0211834 A1 * | 8/2009 | Yasuda | ............... | B60K 17/105 180/367 |
| 2009/0266071 A1 * | 10/2009 | Yasuda | ............... | B60K 17/356 60/484 |
| 2016/0121722 A1 * | 5/2016 | Roberts | .................. | B60K 31/00 180/242 |
| 2016/0122973 A1 * | 5/2016 | Lyle | ...................... | E02F 9/2246 414/687 |

FOREIGN PATENT DOCUMENTS

| | | |
|---|---|---|
| WO | WO-2006/109571 A1 | 10/2006 |
| WO | WO-2009/020509 A1 | 2/2009 |

\* cited by examiner

WORKING MACHINE

FIELD OF THE INVENTION

The present invention relates to working machine. More particularly, but not exclusively, the present invention relates to a transmission for a working machine.

BACKGROUND OF THE INVENTION

Various types of working machines are known. Such machines are used typically for soil-shifting operations (e.g. trenching, grading, and loading) and materials handling (e.g. depositing aggregate in trenches, lifting materials and placing them on an elevated platform).

Such machines are typically manufactured from a set of subassemblies designed specifically for one type of machine, although certain components such as engines, gearboxes, and hydraulic pumps may be shared across different machine types.

Examples of known machines include the following:

Slew excavators comprise a superstructure rotatable in an unlimited fashion relative to an undercarriage. The superstructure includes a working arm arrangement for manipulating an attachment, such as a bucket, to perform working operations of the type listed above, a prime mover, such as a diesel IC engine, a hydraulic pump, and an operator cab. The prime mover drives the hydraulic pump, in order to provide pressurized fluid to operate the working arm arrangement, and also to power one or more hydraulic motors located in the undercarriage that are used to selectively drive either two endless tracks or four wheels (or eight wheels in a dual wheel configuration) for propelling the excavator.

A slew ring rotatably connects the superstructure and undercarriage, and a central rotary joint arrangement enables hydraulic fluid to pass from the pump in the superstructure to the hydraulic motor, and return to the superstructure, irrespective of the relative positions of the superstructure and undercarriage. If the slew excavator uses tracks for propulsion, steering is effected by differentially driving the tracks on opposing sides of the undercarriage. If the slew excavator uses wheels for propulsion, a steering arrangement is used for either two or four wheels, and separate hydraulic control is required for this in the undercarriage.

Slew excavators are available in a wide range of sizes. Micro, mini and midi excavators span a weight range from around 750 kg up to around 12,000 kg and are notable for typically having a working arm arrangement that is capable of pivoting about a substantially vertical axis relative to the superstructure by using a "kingpost" interface to the superstructure. Generally, mini and midi excavators have a weight of above around 1,200 kg. Large excavators, whose weight exceeds around 12,000 kg are often referred to as 'A frame' excavators and typically have a working arm arrangement that is fixed about a vertical axis, and can therefore only slew together with the superstructure. This is a function of the fact that the smaller excavators are expected to operate in more confined spaces and the ability to slew about two mutually offset axes in order to, for example, trench close to an obstacle such as a wall is therefore more desirable for micro, mini and midi excavators.

The working arm arrangement generally includes a boom pivotally connected to a dipper. There are several types of booms available including: a triple articulated boom which has two pivotally connected sections; and a mono boom that is often made from a single generally curved structure. A dipper is pivotally connected to the boom and a mount for an attachment, e.g. a bucket, is provided on the dipper. Hydraulic cylinders are provided to move the boom, dipper and mount relative to each other so as to perform a desired working operation.

Tracked excavators are not able to travel under their own propulsion for significant distances due to a low maximum speed and the damage their metal tracks cause to paved roads. However their tracks enhance the stability of the excavator. Wheeled excavators are capable of "roading" at higher speeds (typically up to 40 kph), and without appreciably damaging paved road surfaces. However, the working arm assembly inevitably extends forward of the superstructure during roading, which can impair ride quality, and forward visibility. When performing working operations the pneumatic tires provide a less stable platform than tracks, so additional stabilizer legs can be deployed for stability.

Since the prime mover, hydraulic pump, hydraulic reservoir etc. are located in the superstructure, the center of gravity of all types of slew excavator is relatively high. Whilst these components can be positioned to act as a counterbalance to forces induced during working operations, packaging constraints may force such positioning to be sub-optimal, and may also restrict sight-lines over the rear of the machine, for example.

Excavators are generally used for operations such as digging. However, if it is desired to perform an operation such as loading, an alternative type of machine must be used. Machines capable of loading operations are known and have various formats. In one format, commonly referred to as a "telescopic handler" or "telehandler", the superstructure and undercarriage are fixed relative to each other and a central working arm in the form of a two or more part telescopic boom extends fore-aft of the machine. The boom pivots about a horizontal axis towards the aft end of the machine, an attachment is releasably mounted to a fore end of the boom, and is pivotable about a second distinct horizontal axis. Commonly used attachments include pallet forks and shovels. Telehandlers may be used for general loading operations (e.g. transferring aggregate from a storage pile to a required location on a construction site) and lifting operations, such as lifting building materials on to an elevated platform.

Telehandlers typically have four wheels on two axles for propulsion, with one or both axles being steerable and driven. A prime mover (typically a diesel IC engine) may be located in a pod offset to one side of the machine between front and rear wheels and is connected to the wheels by a hydrostatic or mechanical transmission. An operator cab is often located on the other side of the boom to the prime mover, and is relatively low between the wheels. Depending upon its intended application, the machine may be provided with deployable stabilizer legs.

A subset of telehandlers mount the cab and boom on a rotatable superstructure in order to combine lifting with slewing operations, at the expense of additional weight and greater height. As these machines are used principally for lifting, instead of loading, they have a longer wheelbase than conventional telehandlers to accommodate a longer boom, impacting maneuverability. Further, as sight-lines towards the ground close to the machine are less critical for lifting than for excavating, these are consequently quite poor.

The cost to develop different machines such as those above for different working applications is significant. Further, the cost and delay to switch a production line from one type of machine to another is also significant.

It is further desirable that working machines become more efficient in operation, in terms of the amount of working operations undertaken for a given amount of fuel used. This may be a function of the fuel efficiency of the prime mover, transmission, driveline and hydraulic system, as well as being due to secondary factors such as poor visibility meaning that an operator needs to reposition the working machine unnecessarily frequently so as to view the working operation or carrying out an operation much more slowly, thereby compromising efficiency.

SUMMARY OF THE INVENTION

A first aspect of the invention provides a working machine comprising a ground engaging structure comprising at least first and second axles, each mounting at least two wheels, a body supported on the ground engaging structure, a working arm mounted to the body so as capable of performing working operations, and a drive arrangement for moving the ground engaging structure to propel the working machine, the drive arrangement including a prime mover and transmission; and wherein the transmission comprises a hydraulic pump driven by the prime mover, a first high speed hydraulic motor to be supplied with hydraulic fluid from the hydraulic pump to drive the first axle to permit the working machine to be driven at relatively high speeds in a first two-wheel drive operating mode, and a second relatively low speed motor to be supplied with hydraulic fluid from the hydraulic pump to drive the second axle at relatively low speeds and configured to be driven in conjunction with the first motor in a second four-wheel drive operating mode.

It will be appreciated this provides a simple and low cost way of providing a working machine with a two range, and selectable 2WD/4WD transmission, without requiring a complex gearbox. Furthermore, the arrangement may save weight by avoiding the need for two drive shafts from a motor to each axle driven by the motor, and may also avoid improve packaging by freeing space previously occupied by the drive shafts for other uses.

In one embodiment, the second axle is a rear axle in a normal direction of travel.

In one embodiment, at least one of the first and second hydraulic motors is located proximate its respective axle.

Providing the working machine with a hydraulic motor located proximate its respective axel is advantageous as it removes the need for a long driveshaft.

In one embodiment, the at least one hydraulic motor is directly connected to its respective axle.

Connecting the hydraulic motor directly to the axle is advantageous as it removes the need for a drive shaft.

In one embodiment, both motors are directly connected to their respective axles.

In one embodiment, the high speed motor has a relatively high displacement per revolution, e.g. 0 to 250 cm3.

In one embodiment, the working machine comprises a second lower pressure pump driven by the prime mover for providing hydraulic fluid for further working machine functions.

Providing the working machine with a second lower pressure hydraulic pump is advantageous as it results in a more efficient supply of hydraulic fluid at specific pressures needed for particular purposes.

In one embodiment, the drive to the first and second pumps is in series.

In one embodiment, the drive to the first and second pumps is in parallel, e.g. via a bevel gearbox.

In one embodiment, the working machine comprises an undercarriage and a superstructure rotatable thereon.

In one embodiment, the prime mover, first hydraulic pump and first and second hydraulic motors are mounted in the undercarriage.

Mounting the prime mover, first hydraulic pump and first and second hydraulic motors is advantageous as it improves operator visibility.

In one embodiment, a majority of the prime mover is positioned below a level coincident with an upper extent of the wheels.

In one embodiment, the prime mover is positioned between the front and rear axles.

Positioning the prime mover between the front and rear axles is advantageous as it improves the overall packaging of the working machine, resulting in a smaller machine footprint.

In one embodiment, the prime mover is mounted in a transverse direction to a fore-aft direction of the working machine.

In one embodiment, the prime mover is mounted substantially perpendicular to the fore-aft direction of the working machine.

In one embodiment, the prime mover is a reciprocating engine including pistons and the engine is mounted such that the pistons have an upright orientation.

In one embodiment, a heat exchanger and cooling fan are mounted adjacent the prime mover and arranged such that an axis of rotation of the fan is substantially parallel to a fore-aft direction of the working machine.

Mounting the heat exchanger and cooling fan are mounted adjacent the prime mover and arranged such that an axis of rotation of the fan is substantially parallel to a fore-aft direction of the working machine is advantageous as it improves the overall packaging of the working machine and provides cooling of the working machine.

In one embodiment, the working machine comprises a fuel tank positioned on one side of an axis extending in the fore-aft direction of the working machine and the prime mover is positioned on the other side of an axis extending in the fore-aft direction of the working machine.

In one embodiment, the working machine comprises a hydraulic fluid tank positioned on one side of an axis extending in a fore-aft direction of the working machine and the engine is positioned on the other side of the axis extending in the fore-aft direction of the working machine.

In one embodiment, the rotary connection between the superstructure and the undercarriage includes a rotary joint arrangement configured to permit electrical signals and/or hydraulic fluid to be routed to the superstructure independently of the position of the superstructure relative to the undercarriage.

In one embodiment, the front and rear axles are configured for at least two wheel steer.

In one embodiment, the front and rear axles are configured for four wheel steer.

BRIEF DESCRIPTION OF THE DRAWINGS

Embodiments of the invention will now be described, by way of example only, with reference to the accompanying drawings, in which.

DETAILED DESCRIPTION

General Format

Figure 1:
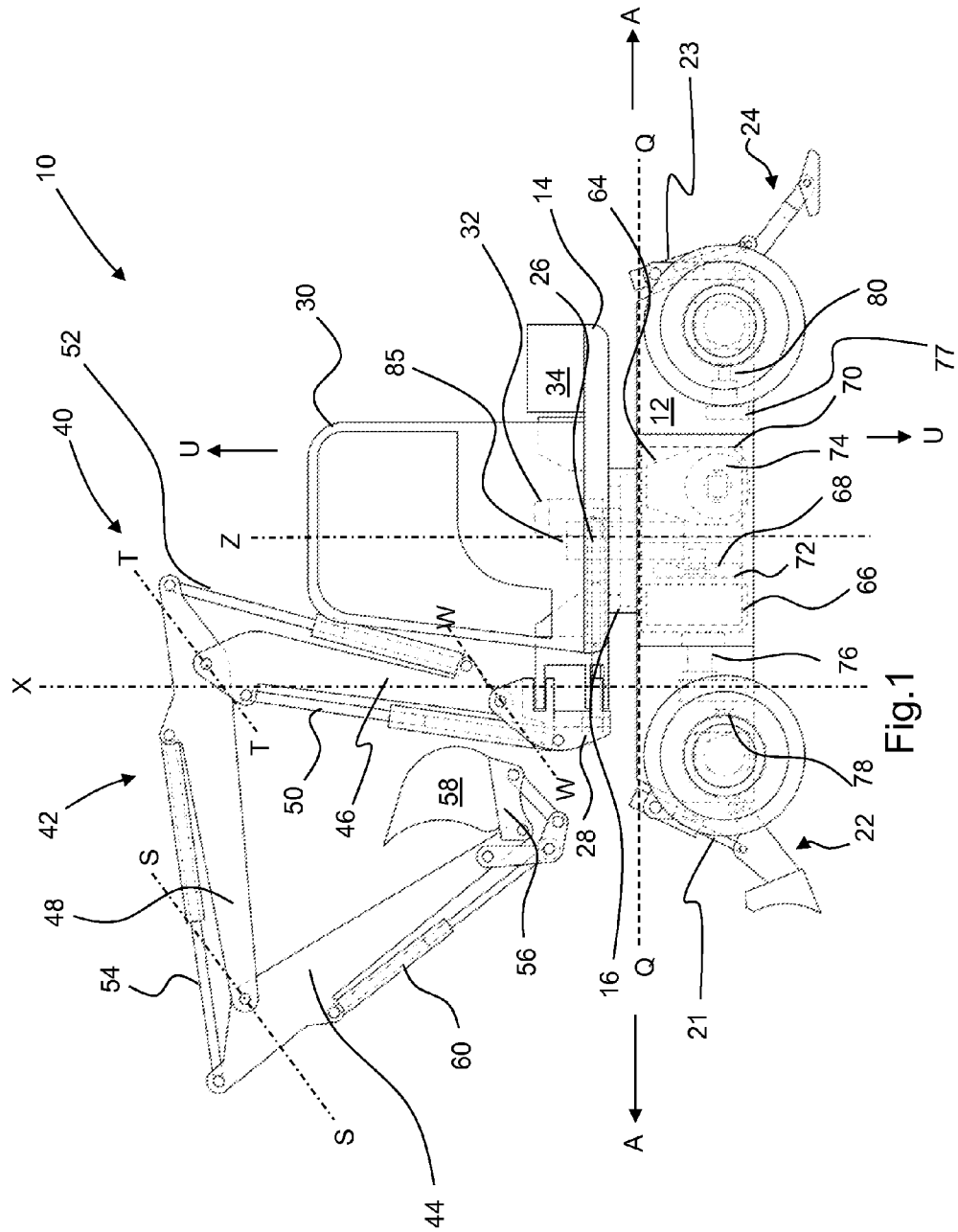
FIG. 1 is a side view of a working machine according to an embodiment of the present invention.
Figure 2:
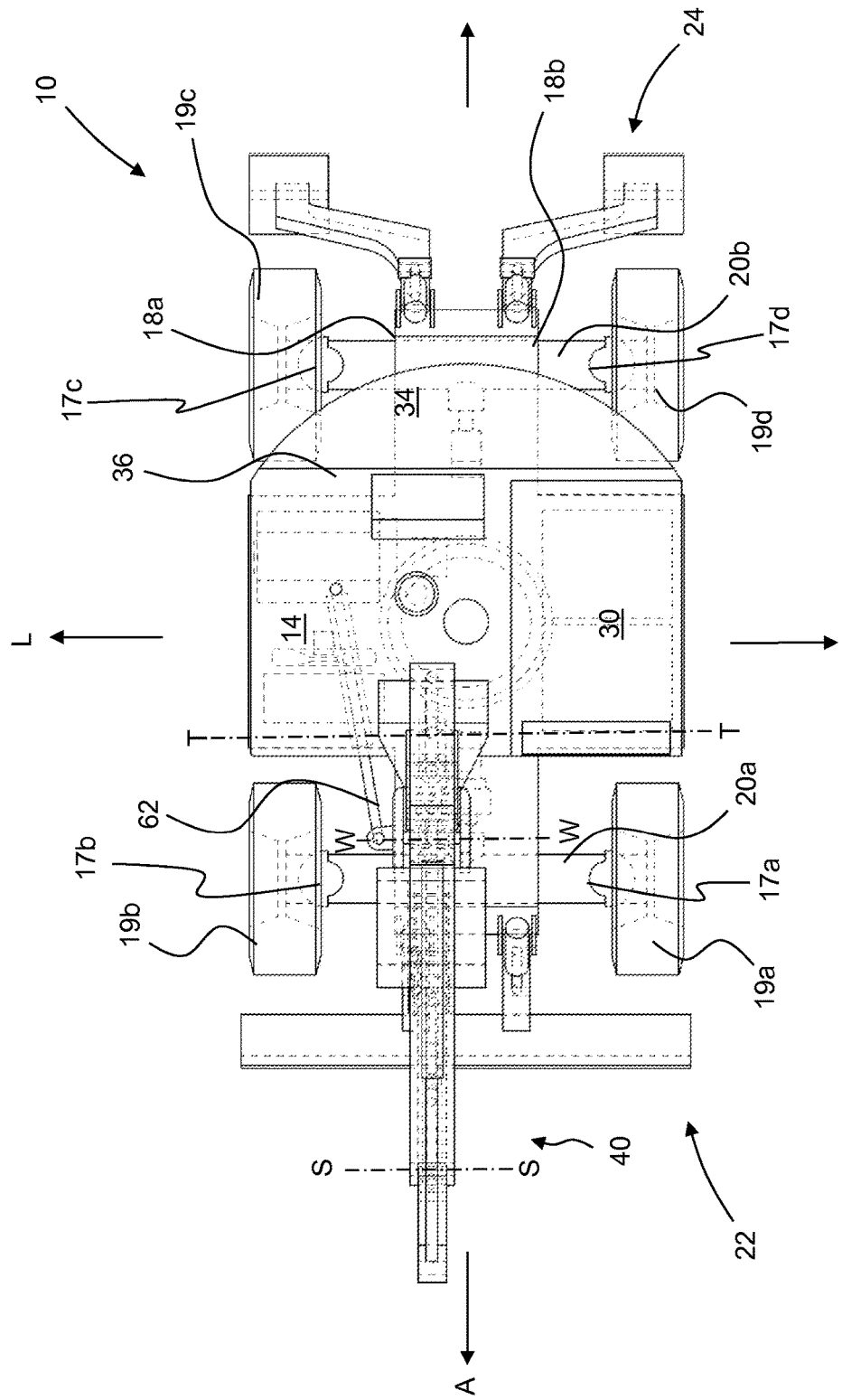
FIG. 2 is a plan view of the machine of FIG. 1.
Figure 3:
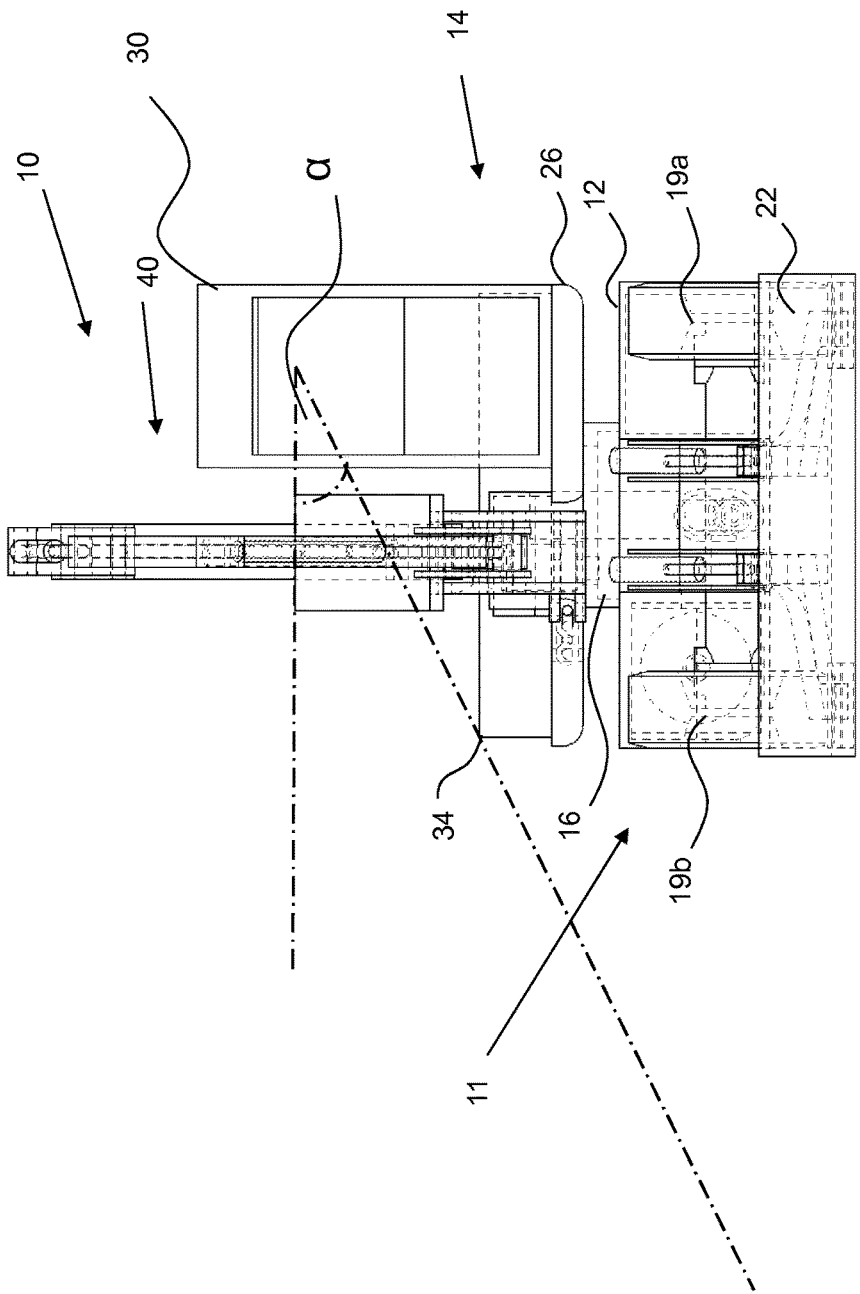
FIG. 3 is a front view of the machine of FIG. 1.

With reference to FIGS. 1 to 3, there is illustrated in somewhat simplified form a working machine 10 according to an embodiment of the present invention. In the present embodiment, the working machine may be considered to be a midi excavator (operating weight between approx. 6 and 12 metric tons). In other embodiments the working machine may be a mini excavator (operating weight between 1.2 and 6 tons). The machine comprises an undercarriage 12 and a superstructure 14 linked by a slewing mechanism in the form of a slewing ring 16. The slewing ring 16 permits unrestricted rotation of the superstructure relative to the undercarriage 12 in this embodiment. A cab 30 from which an operator can operate the working machine is rotatably mounted to the superstructure. A working arm arrangement 40 is rotatably mounted to the superstructure and provided for performing excavating operations.

Undercarriage

The undercarriage is formed from a pair of spaced chassis rails 18a and 18b extending fore-aft, and typically but not always being parallel, or substantially so. The rails provide a majority of the strength of the undercarriage 12. The undercarriage is connected to a ground engaging structure, which in this embodiment includes first and second drive axles 20a and 20b mounted to the chassis rails 18a, 18b and wheels rotatably attached to each axle end. In this embodiment the second drive axle 20b is fixed with respect to the chassis rails 18a, 18b, whereas the first drive axle 20a is capable of limited articulation, thereby permitting the wheels to remain in ground contact, even if the ground is uneven. The wheels 19a, 19b, 19c, 19d, are typically provided with off-road pneumatic tires. The wheels connected to both axles are steerable via a steering hub 17a, 17b, 17c, 17d. In this embodiment, the wheelbase is 2.65 m, and a typical range is 2.0 m to 3.5 m.

For the purposes of the present application, the fore-aft direction A is defined as a direction substantially parallel to the general direction of the chassis rails 18a and 18b. A generally upright direction U is defined as a direction substantially vertical when the working machine is on level ground. A generally lateral direction L is defined as a direction that is substantially horizontal when the working machine is on level ground and is substantially perpendicular to the fore-aft direction A.

In this embodiment a dozer blade arrangement 22 is pivotally secured to one end of the chassis rails 18a and 18b, which may be raised and lowered by hydraulic cylinders 21 using a known arrangement, and also act as a stabilizer for the machine, by lifting the adjacent wheels off the ground when excavating, however this may not be provided in other embodiments.

A stabilizer leg arrangement 24 is pivotally mounted to an opposite end of the chassis rails 18a and 18b, which also may be raised and lowered by hydraulic cylinders 23 using a known arrangement, but in other embodiments this may be omitted.

Drive

Figure 4:
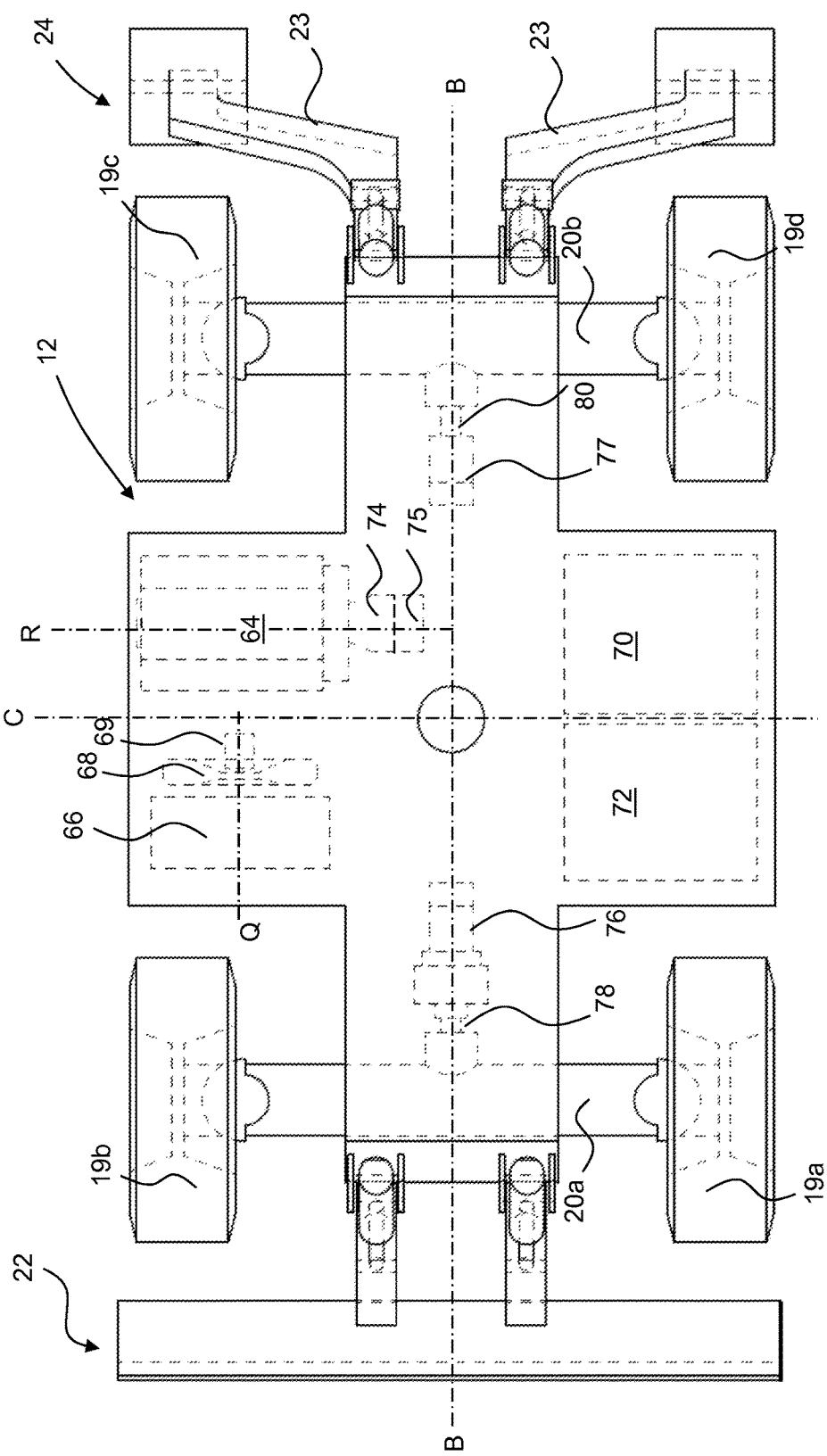
FIG. 4 is a plan view of an undercarriage portion of the machine of FIG. 1.

Referring now to FIG. 4, contrary to known excavators, the drive arrangement, including a prime mover and transmission are housed in the undercarriage 12. In the present embodiment, the prime mover is a diesel IC engine 64.

The engine 64 is mounted to one side of an axis B extending centrally through the undercarriage in a fore-aft direction. The engine 64 is mounted transverse to the axis B, i.e. an axis of rotation R of a crankshaft of the engine is transverse to the axis B in the fore-aft direction. The engine 64 is further orientated such that the pistons of the engine extend in the substantially upright direction U.

A heat exchanger 66 and cooling fan 68 are housed in the undercarriage adjacent the engine 64. The cooling fan 68 is orientated such that the axis of rotation Q of the fan extends in a fore-aft direction A, although it may be oriented differently in other embodiments.

A fuel tank 70 providing a fuel supply to the engine 64 is positioned on an opposite side of the axis B to the engine. A hydraulic tank 72 is provided adjacent the fuel tank 70 on an opposite side of the axis B to the engine.

The engine 64, heat exchanger 66, cooling fan 68, fuel tank 70 and hydraulic tank 72 are all housed in a region between the axles 20a and 20b. As can be seen in FIG. 1, the engine 64 is positioned below a level coincident with a lower extent of the superstructure 14. Indeed the majority of the engine 64, and in this embodiment the entire engine 64 is positioned below a level Q coincident with an upper extent of the wheels 19a, 19b, 19c, 19d. In the present embodiment the majority of the heat exchanger 66, cooling fan 68, fuel tank 70 and hydraulic tank 72 are below a level Q coincident with the upper extent of the wheels 19a, 19b, 19c, 19d.

Figure 5:
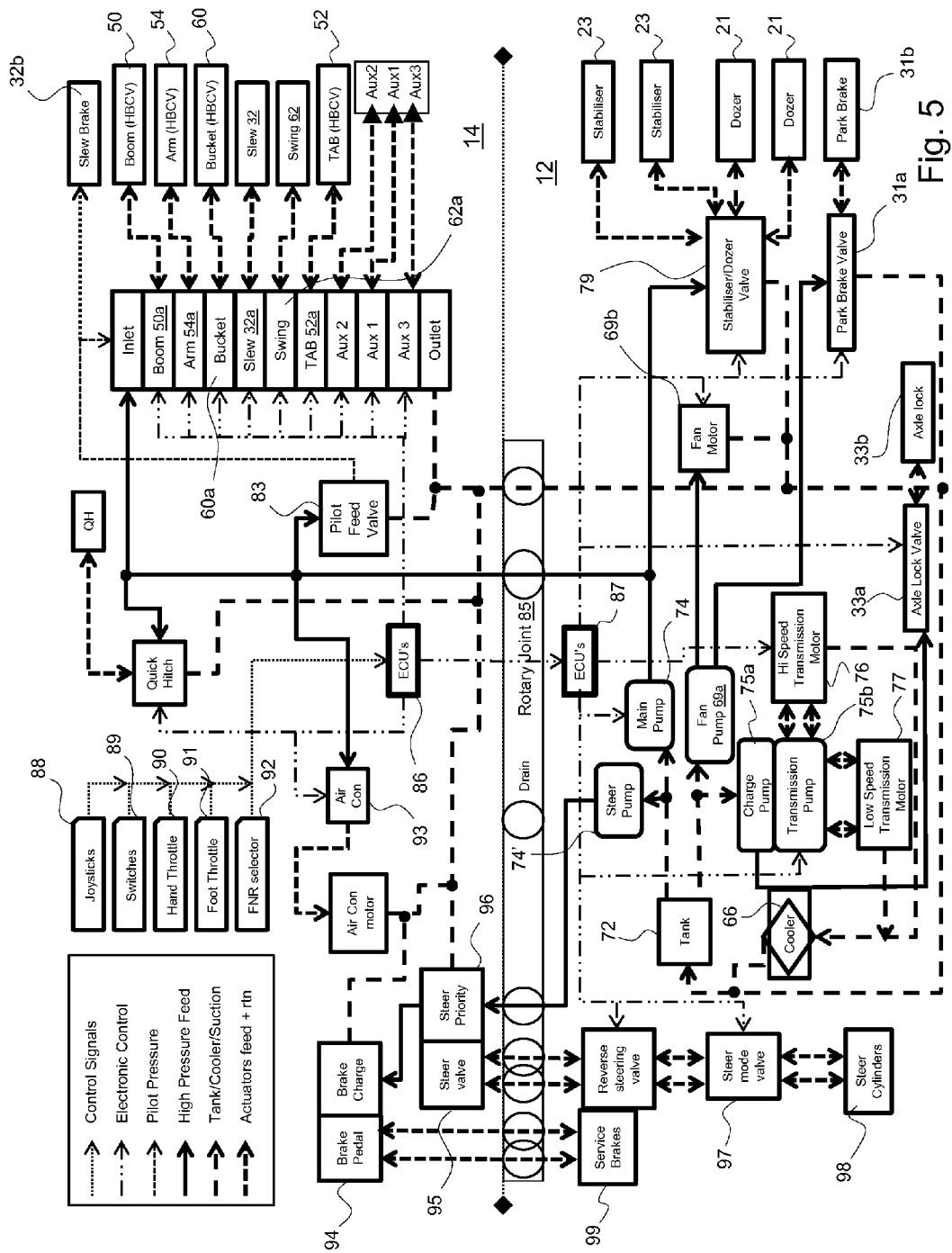
FIG. 5 is a schematic view of a hydraulic and electronic control system of the machine of FIG. 1.

Referring to FIGS. 4 and 5, in the present embodiment the transmission is a hydrostatic transmission. The transmission includes a high pressure swash plate type hydraulic transmission pump 75b as well as an associated charge pump 75a. The transmission pump in turn is capable of selectively driving two hydraulic motors 76 and 77. The transmission pump 75b has a typical operating pressure of around 350-450 bar (35-45 MPa).

The engine 64 is configured to drive the charge pump 75a and the transmission pump 75b. The pumps 75a and 75b are configured to draw hydraulic fluid from the hydraulic fluid tank 72 as required and supply to the hydraulic motors 76 and 77 via dedicated feed and return hoses (i.e. the flow is essentially closed loop with hydraulic fluid drawn from and returned from the tank 72 as required). The motors 76 and 77 are arranged with their drive axes aligned with axis B along the center of the undercarriage 12. In the present embodiment the hydraulic motors 76 and 77 are positioned either side of an axis C extending centrally through the undercarriage in a lateral direction L. That is, in the present embodiment, the hydraulic motor 76 is positioned towards the dozer blade arrangement 22. The engine 64, hydraulic pump 74, and hydraulic motor 77 are positioned towards the stabilizer arrangement 24.

The first hydraulic motor 76 is a high speed swash plate type motor having a large displacement range, for example of 0 to 250 cm3/revolution, and drives the front axle 20a in a normal direction of travel. The output of the motor faces forwards and drives the first axle 20a via a short drive shaft 78 and differential (not shown). The second hydraulic motor 77 is a relatively low speed swash plate type motor having a smaller displacement range for example of 0 to 125 cm3/revolution. The low speed motor 77 connects to a second drive shaft 80 to drive the second (rear) axle 20b via a second differential (not shown).

The charge pump 75a and transmission pump 75b are positioned adjacent the engine 64 and is orientated such that an input to the pump from the engine is axially aligned with an output from the engine to the pump.

Arranging the drive arrangement as described in the undercarriage has been found to result a reduction in the volume of components to be housed in the superstructure, in turn resulting in a line of sight (angle α of FIG. 3) over the right hand rear corner of the machine for an operator having a height of 185 cm (a 95th percentile male) when seated in the operator's seat at the left hand side of the machine in excess of 30° (33° in this embodiment) below the horizontal (compared to around 22° in conventional midi excavators of this size). This results in a significant reduction of the ground area around the machine that is obscured by parts of the superstructure, thereby improving visibility for maneuvering the machine.

A further advantage of positioning the drive arrangement in the undercarriage, compared to conventional excavators where the drive arrangement is generally positioned in the superstructure is that noise, vibration and harshness (NVH) isolation is improved between the engine and the cab to improve comfort and safety for an operator. In addition, access to the engine, fuel tank, fluid tank, etc. for maintenance and refueling is at ground level.

Superstructure

The superstructure 14 comprises a structural platform 26 mounted on the slew ring 16. As can be seen in the Figures, the slew ring 16 is substantially central to the undercarriage 12 in a fore-aft direction A and a lateral direction L, so as to mount the superstructure 14 central to the undercarriage. The slew ring 16 permits rotation of the superstructure 14 relative to the undercarriage about a generally upright axis Z.

A rotary joint arrangement 85 is provided central to the slew ring 16 and is configured to provide multiple hydraulic fluid lines, a return hydraulic fluid line, and an electrical—Controller Area Network (CAN)—signal line to the superstructure 14 from the undercarriage, whilst permitting a full 360° rotation of the superstructure relative to the undercarriage. The configuration of such a rotary joint arrangement is known in the art.

The platform 26 mounts a cab 30. The cab houses the operator's seat and machine controls (discussed below).

The superstructure 14 is rotated relative to the undercarriage 12 using a first hydraulic motor 32 and brake.

The platform further mounts a kingpost 28 for a working arm arrangement 40. The kingpost 28 arrangement is known in the art, and permits rotation of the working arm about a generally upright axis X and about a generally lateral axis W.

The superstructure further comprises a counterweight 34 for the working arm arrangement positioned at an opposite side of the superstructure to the kingpost 28.

Hydraulic Supply

In the embodiment illustrated in FIG. 5, the engine 64 additionally drives a main, lower pressure hydraulic pump 74 arranged in series with the charge 75*a* and transmission pumps 75*b*. In this embodiment the main hydraulic pump has an operating pressure of around 250-300 bar (25-30 MPa) and is also of a variable displacement type.

The main pump 74 supplies hydraulic fluid to the hydraulic cylinders 50, 52, 54, 60, 62 for operating the working arm arrangement via associated valves in the superstructure 14 denoted by the same numeral with the suffix 'a', to a slew brake via a pilot feed valve 83, and to auxiliary hydraulic fluid supplies for use by certain attachments such a grabs etc. (not shown). The main pump 74 additionally supplies hydraulic cylinders 21, 23 of the dozer blade and stabilizer arrangement via a stabilizer/dozer valve 79 in the undercarriage. However, in alternative embodiments a single pump may be used for supplying hydraulic fluid to the motors and the hydraulic cylinders. The main pump is further used to provide hydraulic fluid for air conditioning 93, as illustrated in FIG. 5.

In this embodiment the engine additionally drives a separate pump 74' for the steering system and a fan pump 69*a* to drive a cooling fan 69*b* and a park brake valve 31*a* for a parking brake 31*b*. These pumps are in this embodiment gear pumps operable at a lower pressure of around 200 bar (20 MPa) without ECU control.

Further, the charge pump 75*a* additionally supplies hydraulic fluid to an axle lock valve 33*a* which selectively prevents the articulation of the front axle 20*a*.

Working Arm

The working arm arrangement 40 of the present embodiment is an excavator arm arrangement. The working arm arrangement includes a triple articulated boom 42 pivotally connected to a dipper 44. The triple articulated boom 42 includes a first section 46 pivotally connected to a second section 48. A hydraulic cylinder 50 is provided to raise and lower the first section 46 of the boom 42 relative to the kingpost 28 about the generally lateral axis W. A further hydraulic cylinder 52 is provided to pivot the second section 48 of the boom 42 relative to the first section of the boom about a generally lateral axis T. A yet further hydraulic cylinder 54 is provided to rotate the dipper 44 relative to the boom 42 about a generally lateral axis S. A mount 56 is provided to pivotally mount an attachment to the dipper 44, in the present embodiment the attachment is a bucket 58. A hydraulic cylinder 60 is provided to rotate the attachment relative to the dipper 44. Alternatively boom cylinder arrangements (e.g. twin cylinders) may however be utilized in other embodiments.

Shown most clearly in FIG. 2, a yet further hydraulic cylinder 62 is provided to rotate (swing) the working arm arrangement 40 about the generally upright axis X. Using a hydraulic cylinder arrangement to rotate the working arm arrangement simplifies manufacture and operation of the working machine 10.

Machine Controls

A number of machine control inputs are provided in the cab 30. In this embodiment the inputs (with the exception of steering and braking) are electrically transmitted via a CAN bus to one or more superstructure Electronic Control Unit (ECUs) 86, incorporating a suitable microprocessor, memory etc. to interpret the inputs and signal the various valves for controlling movement of the working arm etc. and/or one or more further undercarriage ECUs 87 to ultimately control hydraulic functions in the undercarriage, including a stabilizer/dozer valve 79, a fan motor 69*b*, park brake valve 31*a*, axle lock valve 33*a*, main pump 74, transmission pump 75*b*, steer mode valve 97.

In alternative embodiments an ECU may only be provided in base assembly (e.g. housed in the undercarriage) and signals from the machine input controls may be sent directly to the ECU(s) 87 in the undercarriage instead of via the ECU(s) 86 in the superstructure. The electrical connections for such an arrangement can be routed from the control inputs to the ECU 87 via the slew ring and rotary joint arrangement.

The control inputs include: joysticks 88 to control operation of the working arm 40, switches 89 for various secondary functions, a hand throttle 90 to set engine speed for working operations, a foot throttle 91 to dynamically set engine speed for roading/maneuvering, and a forward/neutral/reverse (FNR) selector 92 to engage drive in a desired direction.

Due to the safety-critical nature of steering and braking, the brake pedal and steering are hydraulically controlled by a brake pedal 94 and steer valve 95 linked to a steering wheel (not shown). Hydraulic fluid feed is from the dedicated steer pump 74' via the rotary joint 85 and a priority valve 96, which ensure an appropriate supply of hydraulic fluid is provided to the brake pedal 94/steer valve 95, dependent upon demand.

The steer valve 95 then feeds the steer mode valve 97 in the undercarriage 12, which controls whether the machine is operating in four-wheel steer (off road), two-wheel steer (on road) or crab steer, via another feed through the rotary joint. The steer mode valve then feeds hydraulic fluid to appropriate steering cylinders 98, dependent upon the mode chosen.

The brake pedal 94 supplies fluid to service brakes 99 at the wheel ends also via a feed through the rotary joint. A separate hydraulic fluid feed from a fan pump 69a supplies a parking brake valve 31 a as well as the fan motor 69b and axle lock valve 33a under the control of the superstructure ECU(s) 86 and undercarriage ECU(s) 87.

In other embodiments, braking and steering may be affected via electronic control, provided a suitable level of fault tolerance is built into the system.

High Speed Operation

When operating on road ("roading") or e.g. maneuvering on a level/hard surface, speed of movement of the machine 10 is preferred ahead of traction or torque. Thus, in a first two-wheel drive operating mode, the vehicle operator selects 2WD on a 2WD/4WD selector (not shown), signaling the appropriate superstructure ECU 86, in which in turn signals the transmission pump 75b via the undercarriage ECU 87 to permit the flow of hydraulic fluid to the high speed motor 76.

Thereafter, the operator selects forward or reverse from the FNR selector 92, the signal for which is fed through to the transmission pump 75b in a similar manner to direct hydraulic fluid therethrough in the correct flow direction to turn the high speed motor 76, and therefore the wheels 19a and 19b, in the desired direction.

The operator then sets the engine speed using the foot throttle 91 which in turn drives the transmission pump 75b at the desired speed. The undercarriage ECU 87 controls the swash angle of the pump 75b and high speed motor 76, resulting in rotation of the high speed motor 76 and driven rotation of the wheels 19a, 19b on the first axle 20a.

Typically, this enables travel at a maximum speed of around 40 km/h.

Low Speed Operation

For low speed, higher torque, higher traction maneuvering, typically in an off-road location such as a construction site, the operator selects a second four wheel drive operating mode from the 2WD/4WD selector. This in turn signals superstructure ECU 86, which in turn signals the transmission pump 75b via the undercarriage ECU 87 to permit the flow of hydraulic fluid to both the high speed motor 76 and low speed motor 77.

Thereafter, the operator selects forward or reverse from the FNR selector 92, the signal for which is fed through to the transmission pump 75b in a similar manner to determine the direction of flow of hydraulic fluid into the high speed motor 76 and low speed motor 77.

The operator then sets the engine speed using the foot throttle 91 which in turn drives the transmission pump 75b at the desired speed. The undercarriage ECU 87 preferably controls the swash angle of the pump 75b and high speed motor 76 and low sped motor 77, ultimately resulting in rotation of the high speed motor 76, low speed motor 77 and drive to the wheels 19a, 19b, 19c, 19d on both the first and second axles 20a, 20b at compatible speeds.

Typically, this operating mode provides a lower maximum speed for off-road operation e.g. of 10 km/h or less Variants Although the invention has been described above with reference to one or more preferred embodiments, it will be appreciated that various changes or modifications may be made without departing from the scope of the invention as defined in the appended claims.

The pressure and/or flow of hydraulic fluid may be directed to the high and low speed motors 76, 77 in the low speed operating mode in order to shift the balance of power to either motor. For example, in response to the machine sensing loss of traction on one axle through the use of suitable sensors, hydraulic flow may be diverted to the other axle.

The low speed and/or high speed motors may be connected directly to the or each axle they drive, or a pair of high speed motors may drive individual wheels on one axle and low speed motors individual wheels on the second axle.

In other embodiments the charge, transmission and main pumps may be driven in parallel rather than in series via a bevel gearbox, for example and a clutch mechanism may be provided to disengage drive to the pumps if not required for a particular operation.

Although the present invention has been described in the context of a particular machine layout, for which it is considered particularly advantageous, certain advantages of the present invention may be achieved if it is used in more conventional machines such as conventional wheeled slew excavators having engines and hydraulic pumps in the superstructure thereof, or telehandlers, rough terrain cranes etc. having hydrostatic transmissions.

In the presently described embodiment the engine is positioned perpendicular to the axis B so as to reduce the packaging size of the engine and transmission of the present embodiment, but advantages of the invention can be achieved in alternative embodiments where the engine may be positioned at an alternative transverse position, for example between 30 and 70° to axis B measured in a clockwise direction.

In the presently described embodiment the engine is positioned such that a longitudinal axis of the pistons is orientated substantially upright, but in alternative embodiments the pistons may be alternatively orientated, for example the pistons may be substantially horizontal. In further alternative embodiments, the prime mover may not be a diesel engine, for example the engine may be a petrol engine.

The arrangement of the fuel tank, hydraulic fluid tank, heat exchanger, fan and engine of the present invention is advantageous because of its compact nature, but advantages of the invention can be achieved in alternative embodiments where these components may be positioned in alternative locations, for example the fuel tank and hydraulic fluid tank may not be positioned between the axles.

The working arm described includes a dipper and a triple articulated boom, but in alternative embodiments the boom may only be articulated at the connection to the superstructure and the dipper. In further alternative embodiments a section of the boom or the dipper may be telescopic. In yet further alternative embodiments the working machine may be of a different type; for example a telehandler, dump truck, crane, loading shovel or the like.

The working machine may be operated using manual, hydraulic or electro-hydraulic controls.

In the present embodiment, the wheels on both axles are steerable (i.e. the working machine is configured for four wheel steer), but in alternative embodiments only the wheels on one of the axles may be steerable (i.e. the working machine is configured for two wheel steer).

The invention claimed is:

1. A working machine comprising:
a ground engaging structure comprising at least first and second axles, each mounting at least two wheels;
a body supported on the ground engaging structure;
a working arm mounted to the body so as to be capable of performing working operations; and
a drive arrangement for moving the ground engaging structure to propel the working machine, the drive arrangement including a prime mover and transmission; and
wherein the transmission comprises a hydraulic pump driven by the prime mover, a first high speed hydraulic motor to be supplied with hydraulic fluid from the hydraulic pump to drive the first axle to permit the working machine to be driven at relatively high speeds in a first two-wheel drive operating mode, and a second relatively low speed hydraulic motor to be supplied with hydraulic fluid from the hydraulic pump to drive the second axle at relatively low speeds and configured to be driven in conjunction with the first motor in a second four-wheel drive operating mode; wherein the first high speed hydraulic motor comprises a high speed swash plate hydraulic motor and the second low speed hydraulic motor comprises a low speed swash plate hydraulic motor; wherein the high speed swash plate hydraulic motor has a relatively large displacement range and wherein the low speed swash plate hydraulic motor has a smaller displacement range relative to the high speed swash plate hydraulic motor.

2. A working machine according to claim 1, wherein the second axle is a rear axle in a normal direction of travel.

3. A working machine according to claim 1, wherein at least one of the first and second hydraulic motors is located proximate its respective axle.

4. A working machine according to claim 3, wherein the at least one hydraulic motor is directly connected to its respective axle.

5. A working machine according to claim 4, wherein both motors are directly connected to their respective axles.

6. A working machine according to claim 1, wherein the high speed motor has a relatively high displacement per revolution.

7. A working machine according to claim 1, further comprising a second lower pressure pump driven by the prime mover for providing hydraulic fluid for further working machine functions.

8. A working machine according to claim 1, wherein the working machine comprises an undercarriage and a superstructure rotatable thereon.

9. A working machine according to claim 8, wherein the prime mover, first hydraulic pump and first and second hydraulic motors are mounted in the undercarriage.

10. The working machine according to claim 9, wherein a majority of the prime mover is positioned below a level coincident with an upper extent of the wheels.

11. The working machine according to claim 9, wherein the prime mover is positioned between the front and rear axles.

12. The working machine according to claim 1, wherein the prime mover is mounted in a transverse direction to a fore-aft direction of the working machine.

13. The working machine according to claim 12, wherein the prime mover is mounted substantially perpendicular to the fore-aft direction of the working machine.

14. The working machine according to claim 1, wherein the prime mover is a reciprocating engine including pistons and the engine is mounted such that the pistons have an upright orientation.

15. The working machine according to claim 1, wherein a heat exchanger and cooling fan are mounted adjacent the prime mover and arranged such that an axis of rotation of the fan is substantially parallel to a fore-aft direction of the working machine.

16. The working machine according to claim 1, wherein the working machine comprises a fuel tank positioned on one side of an axis extending in the fore-aft direction of the working machine and the prime mover is positioned on the other side of an axis extending in the fore-aft direction of the working machine.

17. The working machine according to claim 1, wherein the working machine comprises a hydraulic fluid tank positioned on one side of an axis extending in a fore-aft direction of the working machine and the engine is positioned on the other side of the axis extending in the fore-aft direction of the working machine.

18. The working machine according to claim 8, wherein the rotary connection between the superstructure and the undercarriage includes a rotary joint arrangement configured to permit at least one of electrical connections and hydraulic fluid to be routed to the superstructure independently of the position of the superstructure relative to the undercarriage.

* * * * *